Patented Sept. 30, 1941

2,257,599

UNITED STATES PATENT OFFICE 2,257,599

METHOD FOR THE MANUFACTURE OF STARCH PRODUCTS

Georg Frischmuth and Engelbert Frobel, Hamburg, Germany, assignors to the firm Deutsche Maizena Gesellschaft m. b. H., Maizenahaus, Hamburg, Germany No Drawing. Application December 9, 1939, Serial Number 308,394. In Germany December 1, 1938

5 Claims. (Cl. 99—139)

This invention relates to the treatment of starch and, more specifically, to an improved method for the production of a starch pudding powder of the cold gelatinizing or cold pasting type.

One of the objects of the invention is to provide an improved and economical method of producing a cold gelatinizing or cold pasting starch pudding powder.

Another object of the invention is to provide a starch pudding powder which is not only cold gelatinizing but is also non-hygroscopic and which is readily adapted, upon the addition thereto of a cold liquid, to provide a smooth, non-lumpy paste which will quickly set to a gel having the desired pudding characteristics.

A further object is to provide a starch pudding powder having the characteristics above described without the use of organic precipitants or chemicals.

Other objects and purposes will more fully appear from the following description.

As is well-known, cold-gelatinizing or swelling starch differs from native and soluble starch in that the cold-gelatinizing or swelling starch will form a paste when mixed with cold water.

Several methods for converting starch into such cold-gelatinizing form have become known, for example by means of the action of chemicals, such as caustic alkalis, calcium chloride or thiocyanates. This treatment results in converting the starch into a cold-gelatinizing form after the admixture of cold water, without any previous pasting. When coming in contact with cold water, the so treated starch granules burst and swell. According to other known methods, a product gelatinizing or swelling when mixed with cold water is attained by pasting effected on hot rollers or plates.

Cold-gelatinizing starch products may be used for either pasting or baking purposes. In the former case they must have a great adhesive power, good capacity of distribution and spreading. As baking means they are intended for regulating the water content of the dough and of the baker's wares, in which cases their respective water-binding strength is of essential importance. Gelatinizing starches which when mixed with cold water furnish a paste of great adhesive power do not show what is called "pudding effect," that is to say, such starches when mixed with cold water do not result in a gelatinizing, easily divisible, pudding-like mass. It is just the opposite properties which are expected from such starch products. For baking purposes they must be possessed of high water-binding capacity, and, when dissolved in a cold liquid, such as water or milk, they must be productive of a non-lumpy paste of relatively great inner cohesion, and must congeal jelly-like after a few minutes. They must, furthermore, if placed in moulds prior to their congelation, result in a gel, which, when dumped, shows a smooth, glossy non-glutinous surface which gel may be easily divisible by means of a spoon, without sticking to the latter.

In other words, such a gel must be possessed of the same properties as a pudding derived from maize starch or pre-treated other native starches, potato starch for instance, by means of boiling it in hot water.

It has already been suggested to produce cold-gelatinizing pudding starch by boiling a pre-treated potato starch with ten times the quantity of water, and by admixing it with fifteen times the quantity of alcohol or acetone. Gelatinizing starch obtained by that method is comparatively strongly hygroscopic, thus rendering the production of pudding powder difficult. Furthermore, the organic precipitants are difficult to remove, and, in addition, increase the cost of production.

The present invention solves the problem of manufacturing a non-hygroscopic, non-lumpy, cold-gelatinizing starch product, without the use of organic precipitants, in a simple and cheap manner. According to the present invention, a standard pudding starch, for example, maize starch and/or preheated other native starch—such as potato starch—for instance, is pasted on roller dryers in a known manner, and the product leaving the roller dryer, by means of fine-crushing and sifting, is mechanically reduced to a size of grain corresponding to the intermediate grain ranging between silk screens of approximately 4000 and 6000 meshes per square centimetre respectively. The thus resulting starch product is adapted for technical purposes, in which connection its gel-producing properties appear desirable, as well as for food purposes. For the purpose of avoiding the formation of lumps during fine-crushing, the product coming from the roller dryer is preferably mixed with approximately the same quantity by weight of powdered sugar, correspondingly fine-ground saccharose, starch sugar, dextrose, or the like, for instance. Homogeneous mixing with the sugar considerably facilitates lump-free mixing with water. Each starch particle is covered by particles of sugar, thus resulting in retarding swelling during mixing. Depending on volatility and adaptability respectively, colouring matters and flavouring substances, such as cacao, coffee, salts, fruit juices and aromatics for instance, may be added previous to, or following, treatment on the roller dryer, i. e. previous to fine-crushing down to the proper size of grain.

It has been proved that best results may be obtained only with the specified fineness of grinding. Still finer crushing results in the fact that swelling is too rapid during mixing, the preparations, consequently, tending to form lumps. If crushing is less fine, then the puddings are difficult to dump, and show a glutinous surface.

Mixtures consisting of 40–50% maize starch and 50–60% of pre-treated potato starch have proved especially well-adapted for the production of cold-gelatinizing pudding powder according to the new method. When mixed with cold water or cold milk, pudding powders made in the stated manner furnish within a few minutes a finished pudding of glossy smooth surface, firm cohesion and good divisibility. They are excellently adapted for popular food, on hikings, and the like. A particular advantage in connection with the manufacture of pudding powder is to be found in the fact that the colouring matters and flavouring substances, primarily when admixed to a small percentage, are thoroughly mixed with the pudding starch.

EXAMPLES

*Example 1*

1500 grammes of maize starch and 2500 grammes of water are stirred up to form a thin starch milk, and under a gauge pressure of 41½ lbs. passed over a roller dryer making approximately 8 revolutions per minute. To each 1000 grammes of the product leaving the roller, 1100 grammes of powdered sugar are admixed in a mixing machine. Subsequently, the mixture is ground twice on a mill, and through Nr. 20 silk of approximately 4000 meshes per square centimetre and Nr. 25 silk of approximately 6000 meshes per square centimetre respectively sifted on intermediate grain. For cholocate-pudding powder, 385 grammes of cacao and 15 grammes of common salt (sodium chloride) are added to the thin starch paste.

For the mixing of chocolate water-puddings, 150 grammes of pudding powder are stirred with 300 cubic centimetres of water. For milk puddings, 160 grammes of the pudding powder are added to a mixture consisting of 200 cubic centimetres of milk and 100 cubic centimetres of water.

*Example 2*

For aromatizing, 250 grammes of coffee are boiled in 1500 cubic centimetres of water, and filtered, and the filtrate used for making a thin starch milk consisting of a mixture of 750 grammes of maize starch and 750 grammes of pre-treated potato starch. 15 grammes of common salt and an additional 100 cubic centimetres of water are added. As provided for in Example 1, the whole mixture is then passed over the roller dryer. To each part of the resulting raw product, an equal part of powdered sugar is then admixed in a mixing machine. Grinding and sifting is effected in the manner described under Example 1.

For the making of mocha water-puddings, 105 grammes of finished product are stirred with 300 cubic centimetres of water. When using milk, 125 grammes are required per 200 cubic centimetres of milk and 100 cubic centimetres of water.

*Example 3*

A thin starch milk consisting of 600 grammes of maize starch, 900 grammes of pre-treated potato starch and 1600 cubic centimetres of water is prepared. After addition of

|  | Grammes |
|---|---|
| Vanillin | 3 |
| Egg-yolk colouring | .8 |
| Macaroni yellow | .25 |
| Common salt | 15 | this starch milk is passed over the roller dryer, as provided under Example 1. To each 1000 grammes of raw material, 1100 grammes of powdered sugar are admixed. Grinding and sifting is effected in the manner described under Example 1. When preparing puddings, 105 grammes of pudding powder are required for each 300 cubic centimetres of water, or 125 grammes of pudding powder for each 200 cubic centimetres of milk and 100 cubic centimetres of water.

By the term "pudding starch" as used herein is intended any starch which, when boiled with water, produces a pudding effect as hereinabove described.

We claim:

1. A method for the manufacture of a starch pudding powder which together with cold water results in a gelatinizing, easily divisible, pudding-like mass, characterized by the feature that pudding starch is treated with heat to paste and dry the same, and then by means of fine-crushing and sifting, the resulting product, mixed with sweetening and flavoring material, is mechanically reduced to a size of grain corresponding to the intermediate grain ranging between two silk screens of approximately 4000 and 6000 meshes per square centimetre respectively.

2. A method according to claim 1, characterized by the feature that after the heat treatment but prior to the comminuting operation, the product is mixed with approximately the same quantity by weight of powdered sugar.

3. Method of making a cold-pasting starch pudding powder which comprises treating a pudding starch in a fluid state on a heated surface to paste and dry the same and thereafter mixing the pasted starch with sweetening and flavoring material and comminuting the mixture to a size adapted to pass through a screen of substantially 4,000 meshes per square centimetre and be retained on a screen of substantially 6,000 meshes per square centimetre.

4. Method of making a cold-pasting starch pudding powder which comprises treating the pudding starch in a fluid state on a heated surface to paste and dry the same and thereafter comminuting the pasted starch, mixed with sweetening and flavoring material, to a size adapted to pass through a screen of substantially 4,000 meshes per square centimetre and be retained on a screen of substantially 6,000 meshes per square centimetre.

5. Method of making a cold-pasting starch pudding powder which comprises subjecting a pudding starch suspension consisting substantially of a fluid mixture of maize starch and potato starch to treatment on a heated surface to gelatinize and dry the same and then grinding the same, mixed with sweetening and flavoring material, to a size adapted to pass through a screen of substantially 4,000 meshes per square centimeter and be retained on a screen of substantially 6,000 meshes per square centimeter.

GEORG FRISCHMUTH.
ENGELBERT FROBEL.